(12) United States Patent
Rahman et al.

(10) Patent No.: US 7,773,509 B2
(45) Date of Patent: Aug. 10, 2010

(54) METHOD AND SYSTEM FOR TRAFFIC CONTROL FOR PROVIDING QUALITY OF SERVICE IN A NETWORK

(75) Inventors: Mahfuzur Rahman, Santa Clara, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 394 days.

(21) Appl. No.: 11/713,517

(22) Filed: Mar. 1, 2007

(65) Prior Publication Data

US 2007/0211631 A1 Sep. 13, 2007

Related U.S. Application Data

(60) Provisional application No. 60/780,399, filed on Mar. 7, 2006.

(51) Int. Cl.
*H04L 12/26* (2006.01)
(52) U.S. Cl. ............... 370/230; 370/236; 370/468
(58) Field of Classification Search ........... 370/230, 370/235, 236, 516, 519, 252, 229, 230.1, 370/232, 233, 234, 236.1, 236.2, 249, 468 370/469
See application file for complete search history.

(56) References Cited

U.S. PATENT DOCUMENTS

| | | | |
|---|---|---|---|
| 7,403,504 B2* | 7/2008 | Sawabe et al. ............ | 370/331 |
| 2005/0213502 A1* | 9/2005 | Convertino et al. ......... | 370/229 |
| 2006/0143295 A1 | 6/2006 | Costa-Requena et al. | |
| 2006/0189322 A1* | 8/2006 | Conte et al. .............. | 455/453 |
| 2006/0242315 A1* | 10/2006 | Nichols .................... | 709/231 |
| 2007/0162165 A1 | 7/2007 | Stirbu et al. | |
| 2007/0211632 A1 | 9/2007 | Song et al. | |
| 2008/0219176 A1* | 9/2008 | Yamada .................... | 370/252 |
| 2008/0259031 A1* | 10/2008 | Yoshino .................... | 345/158 |
| 2009/0138596 A1* | 5/2009 | Song ......................... | 709/225 |

OTHER PUBLICATIONS

Song, A., et al., "UPnP QoS 2.0 Architecture," Dec. 2, 2005, 32 pages.
Hlasny, D. et al., "UPnP QoS Architecture: 1.0, For UPnP Version 1.0," Mar. 10, 2005, pp. 1-28.
Song, A. et al., "UPnP QoS Architecture: 2, For UPnP Version 1.0," Oct. 16, 2006, pp. 1-33.
Wikipedia, "Universal Plug and Play," http://en.wikipedia.org/wiki/Universal Plug and Play, pp. 1-7, printed Jul. 25, 2008.
Fout, T., "Universal Plug and Play in Windows XP," Microsoft TechNet, http://technet.microsoft.com/en-us/library/bb457049, updated Aug. 8, 2001, pp. 1-23, printed Jul. 25, 2008.
U.S. Non-final Office Action for U.S. Appl. No. 11/713,521 mailed Mar. 2, 2010.

* cited by examiner

*Primary Examiner*—Brian D Nguyen
(74) *Attorney, Agent, or Firm*—Kenneth L. Sherman, Esq.; Michael Zarrabian, Esq.; Myers Andras Sherman LLP

(57) ABSTRACT

A method and system for providing QoS in a network using traffic management including traffic stream admission and traffic control, is provided. The traffic stream admission and control is achieved using parameterized QoS within a network. Such parameterized QoS enhances QoS service in the UPnP QoS architecture.

29 Claims, 3 Drawing Sheets

200

METHOD AND SYSTEM FOR TRAFFIC CONTROL FOR PROVIDING QUALITY OF SERVICE IN A NETWORK

RELATED APPLICATION

This application claims priority from U.S. Provisional Patent Application Ser. No. Ser. No. 60/780,399 filed on Mar. 7, 2006, incorporated herein by reference.

FIELD OF THE INVENTION

The present invention relates to providing Quality of Service (QoS) in a network.

BACKGROUND OF THE INVENTION

With the proliferation of networks and connectivity, the need for access to various networks is increasing. Applications that access a network, such as a home network, can be broadly divided into two categories: real-time and non-real-time. Real-time access to the network includes access to data streams such as video or audio, etc., from the network. Non-real-time access to the network includes access to data streams such as e-mail, web pages, File-Transfer Protocol (FTP) downloads, etc., from the network. Real-time data-streams have required bandwidth constraints, while non-real-time data-streams are provided on best efforts traffic without bandwidth constraints.

Quality of Service (QoS) refers to the ability of a network to provide better service for selected network traffic over various technologies. QoS can be quantized by a set of parameters such as bandwidth, delay, delay jitters, priority, etc. QoS provides priority including dedicated bandwidth, controlled jitter and latency for real-time traffic, and improved loss characteristics.

In the context of home networking, QoS can be achieved using two different types of design principles: prioritized QoS and parameterized QoS. Prioritized QoS uses priority tagging to place different types of traffic in different queues. Certain applications (e.g., voice) receive priority treatment, but not a reserved or guaranteed bandwidth. Parameterized QoS provides a certain level of guarantee on bandwidth, delay and jitter.

The Universal Plug and Play (UPnP) QoS 2.0 architecture used in many networks provides priority based QoS, but does not provide any mechanism for parameterized QoS service. Such parameterized QoS service is required for efficient bandwidth and admission control within a network, such as a home network. Further, UPnP QoS 2.0 and Digital Living Network Alliance (DLNA) 1.5 do not provide solutions for establishing QoS for a session and for change of QoS during the session. There is, therefore, a need for method and system for parameterized QoS within a network.

BRIEF SUMMARY OF THE INVENTION

The present invention provides a method and system for providing QoS in a network using traffic management including traffic stream admission and traffic control. In one embodiment, such traffic stream admission and control is achieved using parameterized QoS within a network. In one implementation, such parameterized QoS enhances QoS service in the UPnP QoS architecture (e.g., UPnP 2.0/3.0 within a home network).

The present invention enhances existing UPnP QOS architectures by providing a mechanism to control network bandwidth and reduce traffic delay/jitters in the network. This is achieved by providing an admission control mechanism that makes admission decisions based on parameterized information gathered about the network traffic. Such traffic information includes receiving feedback from admission control module, UPnP QoS Devices and UPnP end devices and source devices in a network. Further, based on information gathered from the network traffic, existing traffic streams in the network are also controlled by upgrading and downgrading priorities of existing traffic streams.

These and other features, aspects and advantages of the present invention will become understood with reference to the following description, appended claims and accompanying figures.

DETAILED DESCRIPTION OF THE INVENTION

The present invention provides a method and system for providing QoS in a network using traffic management including traffic stream admission and traffic control. This is achieved using parameterized QoS in a network. In one example, such parameterized QoS is used to control network bandwidth and reduce traffic delay and jitter for enhancing existing UPnP QOS architectures.

An admission control entity makes source admission decisions based on the available bandwidth in the network and based on the information gathered from the home network traffic. The bandwidth information is related to traffic information feedback from UPnP QoS Devices, UPnP end devices and source devices, in a network. Further, based on the information gathered from the network traffic, existing traffic streams in the network are also controlled by upgrading and downgrading priorities of existing traffic streams.

Figure 1:
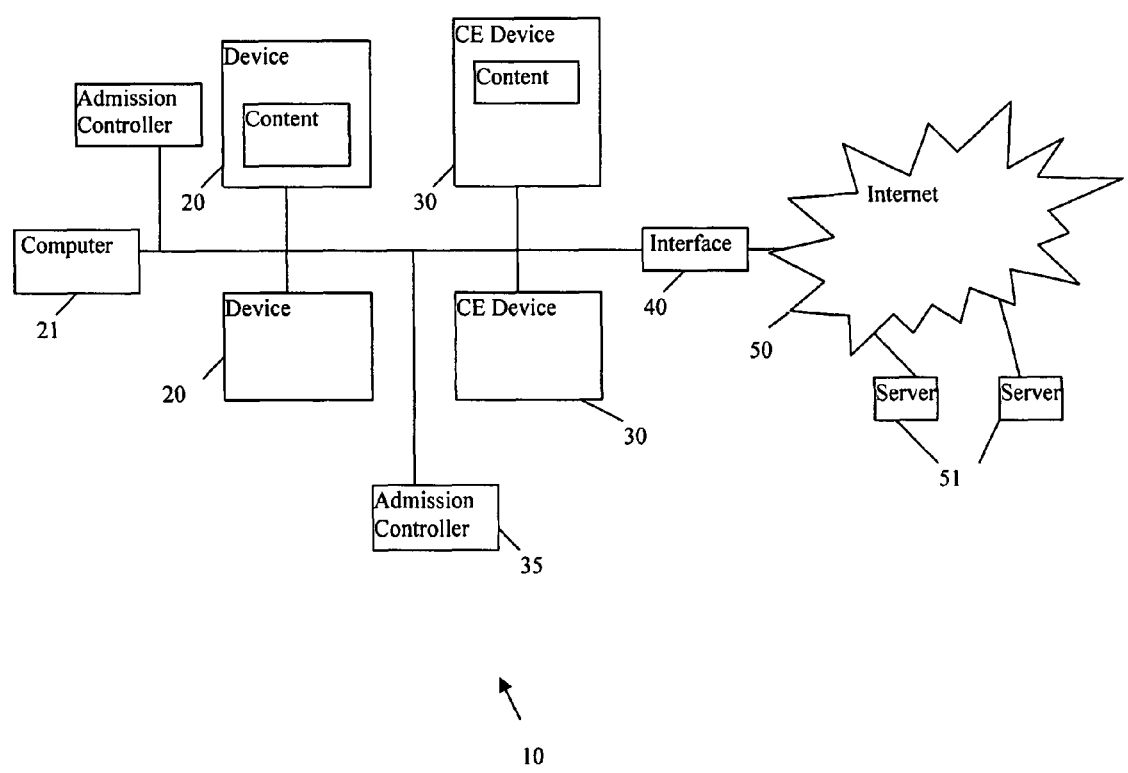
FIG. 1 shows a functional architecture of an example network, such as a home network, embodying aspects of the present invention.

FIG. 1 shows a functional architecture of an example network 10, such as a home network, embodying aspects of the present invention. The network 10 comprises devices 20 which may include content, consumer electronic (CE) devices 30 which may include content, a PC 21 and an optional interface 40 that connects the network 10 to an external network 50 (e.g., another local network, the Internet, etc.). The external network can be connected to one or more servers 51. The devices 20, 21 and 30, implement the Hyper Text Transfer Protocol (HTTP) protocol which uses UPnP for communication in the network 10. The UPnP specification is based on Transmission Control Protocol/Internet Protocol (TCP/IP) and Internet protocols that let devices communicate with each other.

The Internet Protocol (IP) data packet traffic within the home network 10 comprises primarily TCP and User Datagram Protocol (UDP) traffic. The devices within the home network 10 use both real and non-real-time traffic. The real-time applications such as audio/video streaming usually rely on HTTP and Real-time Transport Protocol (RTP). HTTP and RTP use TCP and UDP, respectively, as their base transport protocols. The non-real-time applications such as FTP also use TCP/UDP as a transport protocol.

The present invention enables enhanced QoS within the network 10 by providing said admission control mechanism that controls the consumption of bandwidth of TCP and UDP traffic within the network 10 using an extended UPnP QoS architecture according to the present invention. According to the extended QoS architecture, a data sender (e.g., a device 30) receives feedback from a UPnP QoSManager service (i.e., a QoSManager module) which is responsible for aggregating feedbacks from other QoS entities such as senders and receivers. The data sender then controls the rate of data transmission into the network 10 from that sender.

In this example, the admission control mechanism is implemented in an intermediary module such as an admission controller 35 which can be part of a QoSManager (e.g., QoSManager 106 in FIG. 2), or a separate entity that the QoSManager communicates with before admitting any traffic stream into the network. Based on information gathered about the network traffic, the intermediary module also controls existing traffic streams in the network such as by upgrading and downgrading priorities of existing traffic streams.

In one example, the present invention provides improved TCP Flow Control and RTP Flow Control. The admission controller 35 utilizes feedback from TCP flow control, to control (e.g., restrict) TCP bandwidth, and utilizes the RTP report packets to control (e.g., restrict) RTP-based streaming traffic. The feedback from the UPnP QoSManager service and the feedback from the TCP flow control are gathered by the QoSManager to provide effective QoS in the network 10.

TCP Flow Control

Every TCP connection between a sender (e.g., a source device 30) and a receiver (e.g., a sink device 20), maintains a flow-control window (fwnd) and a congestion control window (cwnd). The sender infers cwnd from network loss behavior, and the sender receives cwnd from the receiver as an advertisement. The sender uses the lesser of fwnd and cwnd (i.e., min (fwnd, cwnd)) as the effective window to calculate the bandwidth of the TCP connection. The rate of data transfer (RDT) is the product of round trip time (RTT), and minimum of fwnd and cwnd, as: RDT=RTT*min (fwnd, cwnd).

Using the admission control mechanism to control the rate of data transfer at the sender, bandwidth within the network is controlled. HTTP-based streaming uses TCP flow control (congestion window: cwnd, fwnd, etc.), to limit bandwidth from the sender in the home network based on the available bandwidth in the network and the requested QoS. Flow control is enforced by the UPnP QoSPolicy Holder and the QoSManager service at the sender. This extends the appropriate functionally required, to the UPnP entities QosDevice, QoSPolicyHolder and QoSManager, in order to enforce TCP flow and admission control.

RTP Flow Control

The admission controller 35 uses a sender report (SR) and a receiver report (RR) for Real-Time Transport Control Protocol (RTCP) packets of information, to calculate bandwidth information and delay information within the network, and makes admission control policy decisions therefrom. RTCP parameters provided by the admission controller 35 notify each sender to control its rate of transmission.

Extending UPnP QoS Architecture

Figure 2:
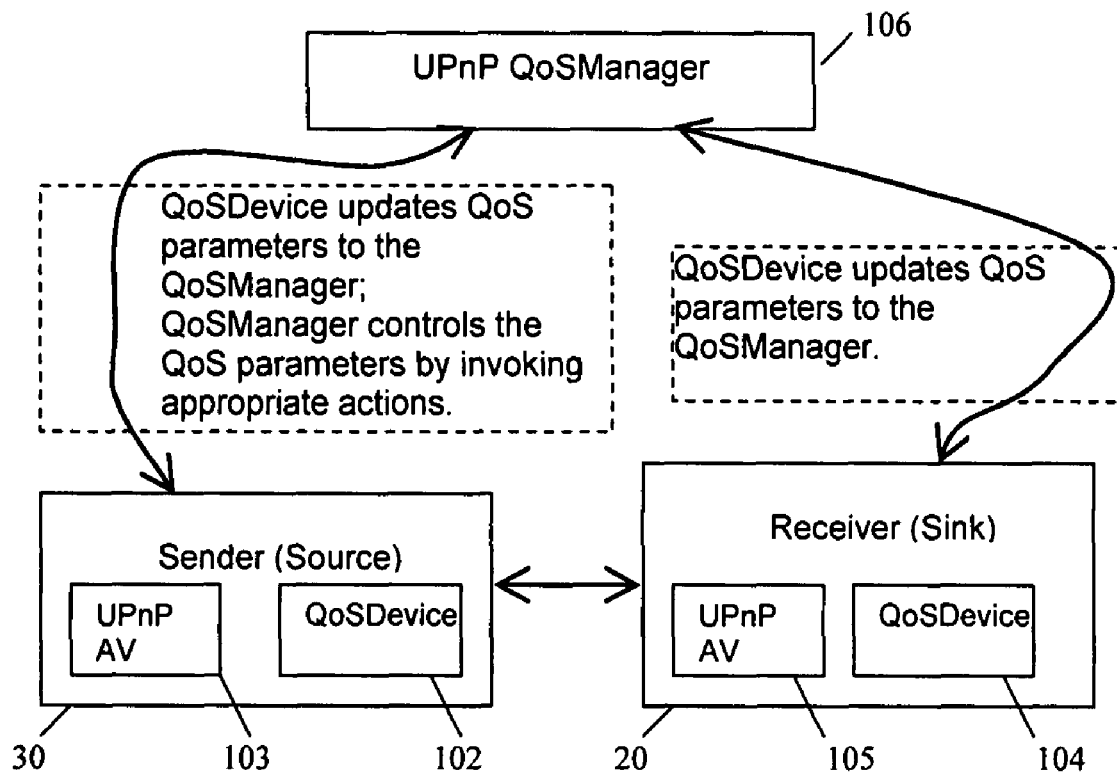
FIG. 2 shows example architecture for parameterized QoS within a network, according to an embodiment of the present invention.

In this example, the conventional logical architecture of UPnP QoS 2.0 is extended with additional features provided in the UPnP QosDevice and QosManager services. FIG. 2 shows architecture of an example system 100 for Parameterized QoS within the UPnP network such as the network 10 in FIG. 1, according to the present invention. A sender (source) 30 and a receiver (sink) 20 implement QosDevice services 102, 104, respectively, or at least part of those services.

The QoS Device services 102, 104, provide feedback to a UPnP QosManager 106 (e.g., implemented in a UPnP capable router, or access point), about traffic stream communication between the sender 30 and the receiver 20 in the network. The sender 30 further includes a UPnP AV 103 which essentially provides an audio/video streaming function (e.g., selection of a media content from a UPnP storage device (digital media server)), between a media storage device and a media renderer device (e.g., TV, digital media player, etc.) in the UPnP network. The UPnP AV 103 also provides control functionality to control audio/video media such as start/stop/play, select, etc. The receiver 20 also includes a UPnP AV 105.

In the conventional QoS 2.0 architecture, the only way to obtain information about traffic from a QosDevice is to use a GetQosState action to obtain information about the currently active traffic streams on the device using TrafficDescriptor structures. However, the conventional QoS 2.0 TrafficDescriptor structure is inadequate in providing bandwidth, delay and delay jitter, etc., information.

An extended UPnP QoS architecture according to the present invention includes a Traffic specification (Tspec) structure that includes QoS parameters. In one example, the Tspec structure includes a set of QoS parameters that define the characteristics of a traffic stream. The Tspec specifies in detail the QoS requirements for a traffic stream. The QoS parameters include, but are not limited to, bandwidth information, delay information, jitter information, etc. When the UPnP control point requests QoS for a traffic stream, that stream is described in the Tspec that the control point submits. Such information is then used by the various UPnP QoS entities (QoSManager, QoSPolicy Holder and QoSDevice) to determine the proper handling for the stream. As such, the Tspec structure should always be submitted with as much information as is known at the time.

When a UPnP control point wishes to admit a QoS stream into the network, the UPnP control point creates a Tspec structure for that specific traffic stream and invokes a UPnP action to the UPnP QoSManager to admit that stream into the network.

For example, contention-based medium access is susceptible to severe performance degradation when overloaded. In overload conditions, the contention windows become large, and more and more time is spent in backoff delays rather than sending data. Admission control according to the present invention regulates the amount of data contending for the medium. Such admission control is negotiated by the use of a Tspec, which is the primary mechanism for communication of QoS parameters to a UPnP QoSManagementEntity implementing traffic admission/control according to an embodiment of the present invention. The QoSManagementEntity can be implemented in the QosManager or in a separate admission controller, for traffic admission and control of existing traffic streams.

As shown in FIG. 2, the QoSDevice 102 of the sender 30 provides feedback (updates) of sender QoS parameters to the QoSManager 106. Similarly, the QoSDevice 104 of the receiver 20 provides feedback (updates) of receiver QoS parameters to the QoSManager 106. An UpdateQosState action is provided for use by the QoSDevice 102 of the sender 30, and the QoSDevice 104 of the receiver 20, to provide such feedbacks to the QosManager 106, indicating a global view of QoS parameters in the network. The UpdateQosState action name is provided as an example, and can be another name.

The QoS parameters include bandwidth information, delay information, jitter information, etc. The UpdateQosState action is implemented by the UPnP QoSManager for invocation on a QoS Device, wherein the QoSDevice provides the invocation interface. Global QoS status involves obtaining traffic information from all of the receivers, senders and intermediary devices, to make traffic management decisions. This also includes obtaining feedback from the TCP flow control, the RTCP XR reports and layer 2 QoS data from intermediary devices. A QosManager can also obtain traffic information from a QosDevice by UPnP eventing. Whenever there is a change in traffic information in a QosDevice device, that particular device sends information events about the changes to the QosManager. The QosManager needs to subscribe to receive change of traffic information event state variables. The state variable includes traffic information such as bandwidth, delay, etc.

Utilizing said feedbacks, the QoSManager 106 controls the QoS parameters by invoking appropriate actions. For example, the QosManager 106 invokes an UpdateTrafficQoS action to instruct the sender 30 to control the traffic the sender 30 inserts into the network by using flow control procedures. The UpdateTrafficQoS action is invoked by the UPnP QoSManagementEntity implemented in the UPnP QoSManager for instructing the sender to reduce the amount of traffic inserted by the sender by an amount specified by the UpdateTrafficQoS action.

New Roles for UPnP QosManager Service

When a UPnP control point desires to admit a QoS stream into the network, the UPnP control point creates a Tspec for that specific traffic stream and invokes a UPnP action to the UPnP QoSManager to control admission of that traffic stream into the network.

The role of a conventional QosManager service is extended according to the present invention, to incorporate additional features in the UPnP QosManager 106 for making well-informed decisions about controlling admission of such traffic (e.g., streaming, etc.) into the network, and about bandwidth management by controlling the rate of existing streams in the network.

In one example, such extensions for the UPnP QosManager 106 according to the present invention include:

a) RTCP Packet Monitoring and Controlling the RTP Source

The UPnP QosManager 106 monitors the RTP Control Protocol Extended Reports (RTCP XR) which provide traffic information in the UPnP network. Using the RTCP XR reports, the QosManager 106 calculates the average payload data rate and the average packet rate over an interval. The QoSManager 106 further calculates the throughput available to the receiver 20. The UPnP QosManager 106 provides appropriate feedback (e.g., information about available throughput, packets received or lost, etc., since the last report) to the sender(s) 30 and receiver(s) 20. The sender 30 modifies its transmissions based on the feedback from the QosManager 106 (e.g., sender 30 increases its transmission rate to the receiver 20).

The QosManager 106 need only receive the RTCP XR packets and not the corresponding RTP data packets, to evaluate the performance of the network for multicast distribution of data. The QosManager 106 can use inter-arrival jitter information to obtain a short-term measure of network congestion. A jitter measure may indicate congestion before it leads to packet loss. The QosManager 106 determines new traffic admission in the network based on the RTCP XR traffic parameters.

b) Monitoring and Controlling the TCP Senders by the QosManager

The QosManager 106 monitors initiators of TCP traffic in the UPnP network. For example, the QosManager 106 monitors the TCP flow control/bandwidth parameters from the sender(s) 30 and generates an aggregated TCP throughput in the entire network. Once the QosManager 106 has overall information about the network bandwidth, it can apply admission and bandwidth control policy by upgrading/downgrading existing traffic, based on the available bandwidth.

Aggregation of QoS Related Information for Admission Control

According to a further implementation of the present invention, for more informed admission decisions for future traffic, an overall view of bandwidth utilization in the network is obtained. In one example, this is achieved by aggregating the layer 2 QoS related information (bandwidth, congestion, etc.) received from the QoS Devices 102, 103 in the network, with layer 3 (and higher) QoS information received from the RTCP XR reports along with the TCP flow control feedbacks. This provides parameterized QoS in the network to provide efficient management of network bandwidth, and reduce congestion in the network by using an efficient admission control mechanism.

Further, aggregation of layer 2 QoS information with layer 3 (and higher) QoS feedbacks, allows informed admission and bandwidth control in the network. This enhances UPnP QoS 2.0/3.0 without changing the basic UPnP QoS architecture.

In one example, the UPnP QoSManager 106 as an intermediary module performs the aggregation. In another example, other intermediary modules that admits and/or controls traffic (e.g., QoS device) in the network can also perform the aggregation. The intermediary module can reside in the QosManager itself or can be a separate entity.

The present invention further provides a mechanism to restrict TCP/RTP bandwidth in the network by providing feedback information to the sender 30, and by monitoring the TCP/RTP traffic in the network. As such, the present invention allows real-time control, establishment and change of QoS for sessions between the senders 30 and receivers 20, by controlling the throughput of the sender(s) 30 in the network.

Figure 3:
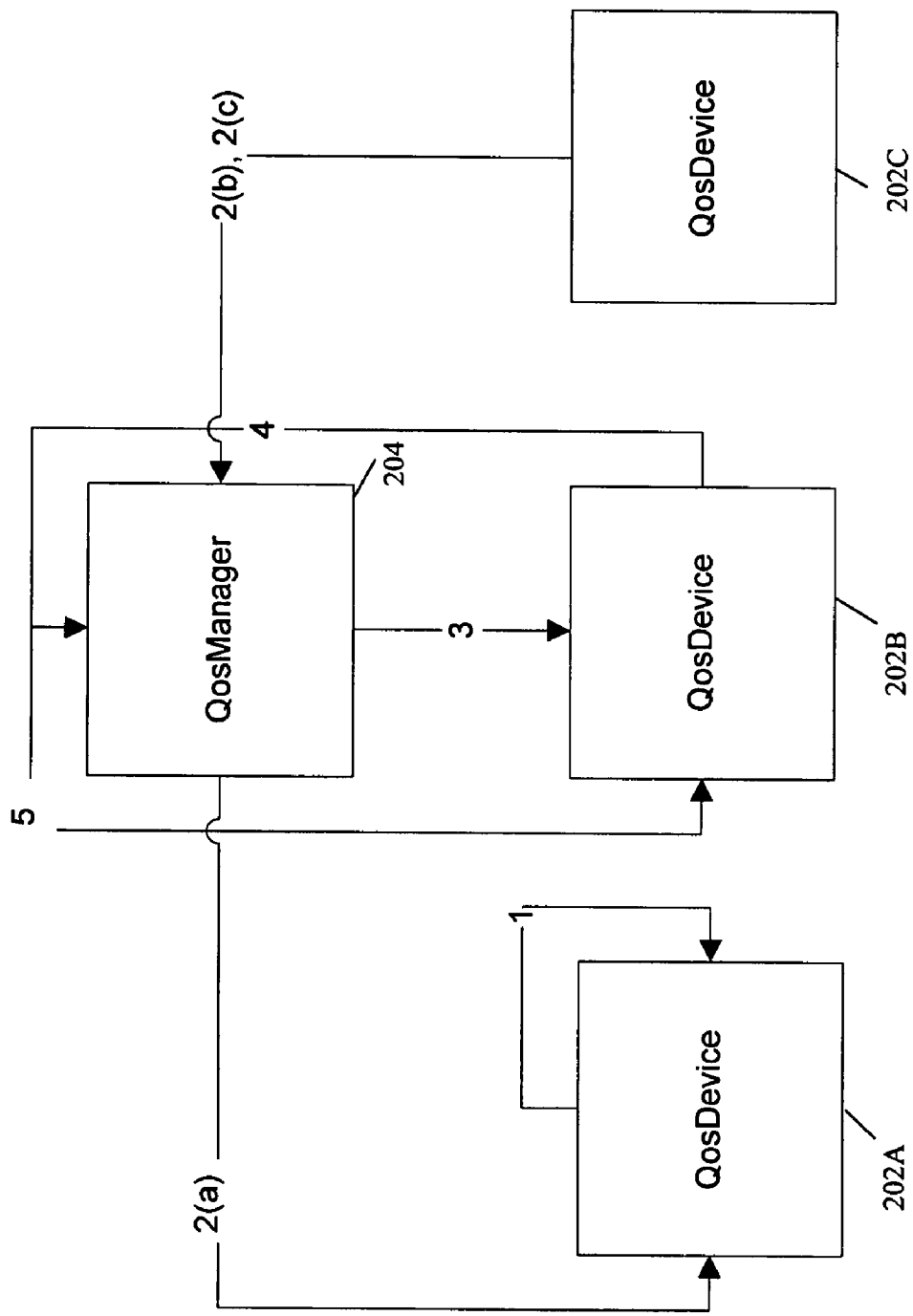
FIG. 3 shows a flowchart of a process for parameterized QoS in a network, according to an embodiment of the present invention.

FIG. 3 shows a control flow 200 for traffic admission control in a network, including multiple QoSDevices 202A-C and a QosManager 204, according to an embodiment of the present invention, including the following steps (also shown in FIG. 3):

Step 1: Each of one or more QoSDevices gather QoS related information (e.g., traffic, bandwidth, delay jitters, etc.) from traffic streams into and out of that QoS device. FIG. 3 shows QoSDevice 202A gathering traffic information, and preferably other QoSDevices perform the same step.

The QoSManager retrieves/receives QoS related information (layer 2, 3 or higher) for various traffic streams from the QoSDevices by using one or more of the following steps:

Step 2a: The QoSManager can invoke a GetQosState action to retrieve such QoS related information from one or more QosDevices (e.g., QoSDevice 202A).

Step 2b: The QoSManager can also retrieve such QoS related information from one or more QoSDevices (e.g., QoSDevice 202C) by using a UPnP eventing mechanism. The QoSManager subscribes for QoS state changes of source and the sink QoSDevices, and whenever there is a change in a QoS state of a QoSDevice, that QoSDevice sends updates to the QoSManager as RTCP XR reports.

Step 2c: The QoSManager can also retrieve such traffic information from one or more QoSDevices (e.g., QoSDevice 202B), using the RTCP XR reports from the QoSDevices for RTP streaming.

Step 3: Using the retrieved/received traffic information, the QoSManager calculates the aggregate bandwidth used by various traffic streams. Using the bandwidth calculation, the QoSManager decides whether to downgrade or upgrade traffic parameters for a stream output from a QoSDevice (e.g., QoSDevice 202B) based on traffic importance of the streams. The downgrade or upgrade is performed by invoking a UPnP action, or by using out of band (not UPnP) mechanisms, on one or more QoSDevices as necessary. An upgrade provides more bandwidth for a stream (e.g., the source QoSDevice reduces the stream rate), and a downgrade reduces the bandwidth available for a stream (e.g., the source QoSDevice increases the stream rate). An upgrade decision for a stream can be made when there is available bandwidth in the network. A downgrade decision for a stream can be made when bandwidth must be made available for upgrade of another stream (e.g., a delay/jitter sensitive stream such as a real-time stream), or for admission of a new stream.

Step 4: A source QoSDevice (e.g., UPnP control point) submits a request to admit a traffic stream to the network.

Step 5: When a QosManager receives a request from a source QoSDevice to admit a new stream to the network, the QosManager compares the total network bandwidth against a calculated aggregate bandwidth used by all of the traffic streams in the network, to determine whether to admit this new traffic stream. In one example, the traffic stream is admitted if there remains an available portion of the total bandwidth in the network.

Though in the example shown in FIG. 3 the QoSManager performs admission control, such admission control can be implemented in a separate admission entity (e.g., admission controller 35 in FIG. 1) in the network, such that the QosManager contacts the admission entity to obtain a decision on admission of a traffic stream.

Other examples of upgrade/downgrade/admission decision making (based on total network bandwidth, calculated aggregate bandwidth used by all of the traffic streams in the network, etc.) can be implemented to control network traffic and manage bandwidth requirements for QoS, according to the present invention. Further, there can be more than one intermediary module (e.g., admission controller) in the network for handling traffic admission and management.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for providing Quality of Service (QoS) within a network including devices, comprising:
employing a processor for:
obtaining parameterized traffic information from a receiver device on a network; and
performing traffic management by traffic stream admission and traffic control in the network, based on the parameterized traffic information including Real-Time Transport Control Protocol (RTCP) Extended Reports (RTCP XR) from devices in the network, wherein performing traffic management includes providing traffic feedback based on the RTCP XR,
wherein the traffic feedback enables a sender to control data transmission rate from the sender into the network, wherein the traffic feedback is based on calculating average payload data rate and average packet rate over an interval using RTCP XR, calculating a throughput available, and providing the results of the calculations as traffic feedback,
wherein the sender is configured to control its rate of data transmission into the network by modifying its transmissions based on the traffic feedback.

2. The method of claim 1 wherein performing traffic management includes traffic stream admission and traffic control for reducing traffic delay and jitters based on the traffic information, wherein traffic stream admission and traffic control further comprises making source admission decisions and changing priorities of existing traffic streams.

3. The method of claim 2 wherein performing traffic management includes providing a UPnP management module including a UPnP QoSManager implementing traffic management in the network based on the parameterized traffic information.

4. The method of claim 3 further including the UPnP QoSManager controlling consumption of bandwidth of TCP and UDP traffic within the network at layer 3 and higher.

5. The method of claim 3 further including the UPnP QoSManager controlling consumption of bandwidth of TCP and UDP traffic within the network at both layer 2 QoS information in addition to layer 3 and higher.

6. The method of claim 3 wherein performing admission control further includes:
the UPnP QoSManager determining an available network throughput based on the parameterized traffic information;
providing network throughput information from the UPnP QoSManager to the sender in the network; and
based on the network throughput information, the sender device controlling the rate of data transmission from the sender into the network.

7. The method of claim 6 further including:
aggregating said parameterized traffic information including TCP flow control;
the UPnP QoSManager determining the available network throughput based on the aggregated parameterized traffic information; and
controlling TCP bandwidth used by the sender based on the network throughput information.

8. The method of claim 7 wherein:
controlling TCP bandwidth includes controlling RTP-based streaming traffic based on the available network throughput information.

9. The method of claim 6 further including:
the sender and a receiver in the network each implementing a QoSDevice service, wherein the QoSDevice services provide to the QoSManager information about traffic stream communication between the sender and the receiver.

10. The method of claim 6 further including providing a Traffic specification (Tspec) structure that includes parameterized QoS information.

11. The method of claim 10 further including:
a UPnP control point providing a Traffic specification (Tspec) structure that includes QoS parameters for a traffic stream, to request admission of the traffic stream into the network from the QoSManager.

12. The method of claim 6 further including:
providing an action for a QoSManager to invoke a QoSDevice to provide feedback for parameterized traffic information, including a global status of QoS parameters in the network, to the QoSManager.

13. The method of claim 12 further including:
providing an UpdateTrafficQoS action for traffic control; and
the QoSManager invoking an UpdateTrafficQoS action based on the parameterized traffic information to instruct the sender to control the flow of traffic the sender inserts into the network.

14. The method of claim 6 further including:
the QoSManager receiving the parameterized traffic information from a QoSDevice by UPnP eventing.

15. The method of claim 2 wherein performing traffic management includes:
providing a UPnP intermediary module implementing traffic management in the network based on the parameterized traffic information and a QoSManager interacting with the intermediary module to make traffic management decisions.

16. The method of claim 2 wherein performing traffic management includes providing a UPnP QoSManager implementing traffic management in the network based on the parameterized traffic information.

17. The method of claim 1 wherein a UpnP QoSManager is configured to receive RTCP packets without requiring corresponding Real-Time Transport Protocol (RTP) data packets, to determine network performance in multicast distribution, for generating the traffic feedback.

18. The method of claim 1 further comprising obtaining parameterized traffic information from other devices on the network.

19. The method of claim 1 further comprising obtaining parameterized traffic information from other devices on the network excluding the sender.

20. A system for parameterized QoS within a network of one or more senders and one or more receivers, comprising:
means for obtaining traffic information within the network; and
a controller that is configured for managing traffic inserted by a sender into the network using the traffic information, the controller including a UPnP QoSManager configured for monitoring Real-Time Transport Control Protocol (RTCP) Extended Reports (RTCP XR) from devices in the network, and providing traffic feedback to the sender based on the reports, to manage traffic in the network, wherein the traffic feedback enables the sender to control the rate of data transmission from the sender into the network,
wherein the QoSManager is further configured to provide said traffic feedback by calculating average payload data rate and average packet rate over an interval using RTCP XR, calculating a throughput available, and providing the results of the calculations as traffic feedback,
wherein the sender is configured to control its rate of data transmission into the network by modifying its transmissions based on the traffic feedback from the QoSManager and RTCP XR,
wherein the QoSManager is further configured to receive RTCP packets without requiring corresponding Real-Time Transport Protocol (RTP) data packets, to determine network performance in multicast distribution, for generating said traffic feedback.

21. The system of claim 20 wherein the QoSManager is further configured to utilize inter-arrival jitter information to obtain a short-term measure of network congestion for generating said traffic feedback.

22. The system of claim 21 wherein a jitter measure indicates congestion before causing packet loss.

23. The system of claim 22 wherein the QoSManager is further configured to determine new traffic admission in the network based on RTCP traffic parameters.

24. The system of claim 20 further including:
a UPnP control point that is configured to provide a Traffic specification (Tspec) structure that includes QoS parameters for a traffic stream, to request admission of the traffic stream into the network from the QoSManager.

25. The system of claim 20 wherein the QoSManager is further configured to monitor initiators of TCP traffic and monitor TCP flow control/bandwidth parameters from the sender, to determine an aggregated TCP throughput in the network for generating said traffic feedback.

26. The system of claim 25 wherein the QoSManager is further configured to apply admission and bandwidth control policy based on available bandwidth in the network, for generating said traffic feedback.

27. The system of claim 20 wherein the QoSManager is further configured to perform traffic management by utilizing feedbacks from both TCP based flow control and RTCP feedbacks.

28. The system of claim 20 wherein the QoSManager is further configured to make traffic management decisions based on using layer 2 QoS information, and layer 3 and higher feedback including TCP flow control and RTCP feedbacks.

29. A system comprising:
means for obtaining traffic information within a network; and
a controller that is configured for managing traffic inserted by a sender into the network using the traffic information, the controller configured for monitoring Real-Time Transport Control Protocol (RTCP) Extended Reports (RTCP XR) from devices in the network, and providing traffic feedback to the sender based on the reports, for managing traffic in the network, wherein the traffic feedback enables the sender to control the rate of data transmission from the sender into the network, wherein the controller is further configured to provide said traffic feedback by calculating average payload data rate and average packet rate over an interval using RTCP XR, calculating a throughput available, and providing the results of the calculations as traffic feedback,
wherein the sender is configured to control its rate of data transmission into the network by modifying its transmissions based on the traffic feedback from the controller and RTCP XR.

* * * * *